US006001435A

United States Patent [19]

Hardy et al.

[11] Patent Number: 6,001,435

[45] Date of Patent: Dec. 14, 1999

[54] ILLUMINATING HOLIDAY TREE

[76] Inventors: Serena Hardy, 5400 2nd St., Rocklin, Calif. 95677; Michael Hale, 560 Patton Dr., Roseville, Calif. 95747

[21] Appl. No.: 09/048,422

[22] Filed: Mar. 26, 1998

[51] Int. Cl.[6] .......... A01N 3/00

[52] U.S. Cl. .......... 428/18; 428/19; 428/20; 362/123

[58] Field of Search .......... 428/18, 19, 20; 362/123

[56] References Cited

U.S. PATENT DOCUMENTS 3,210,232 10/1965 Wielland .
3,959,536 5/1976 Chase .
3,967,019 6/1976 Magee .
4,130,678 12/1978 Higgins .
4,620,270 10/1986 Laakso .
4,878,157 10/1989 Koch .
5,568,966 10/1996 Miller .

*Primary Examiner*—Timothy Speer

[57] ABSTRACT

A decorative Christmas tree device is provided including a base. A post is coupled to the base and extended upwardly therefrom. At least one light is mounted to the post and base for illuminating upon the receipt of power. Further included is monofilament line for encompassing the post, base, and light. As such, the illumination of the light permeates through the line.

8 Claims, 2 Drawing Sheets

ILLUMINATING HOLIDAY TREE

BACKGROUND OF THE INVENTION

1. Field of the Invention

The present invention relates to lighted trees and more particularly pertains to a new illuminating holiday tree for uniquely illuminating a decorated holiday tree.

2. Description of the Prior Art

The use of lighted trees is known in the prior art. More specifically, lighted trees heretofore devised and utilized are known to consist basically of familiar, expected and obvious structural configurations, notwithstanding the myriad of designs encompassed by the crowded prior art which have been developed for the fulfillment of countless objectives and requirements.

Known prior art lighted trees include U. S. Pat. No. 4,130,678; U.S. Pat. No. 5,094,893; U.S. Pat. Des. No. 360,380; U.S. Pat. No. 4,612,218; U.S. Pat. Des. No. 325,887; and U.S. Pat. No. 3,959,536.

In these respects, the illuminating holiday tree according to the present invention substantially departs from the conventional concepts and designs of the prior art, and in so doing provides an apparatus primarily developed for the purpose of uniquely illuminating a decorated holiday tree.

SUMMARY OF THE INVENTION

In view of the foregoing disadvantages inherent in the known types of lighted trees now present in the prior art, the present invention provides a new illuminating holiday tree construction wherein the same can be utilized for uniquely illuminating a decorated holiday tree.

The general purpose of the present invention, which will be described subsequently in greater detail, is to provide a new illuminating holiday tree apparatus and method which has many of the advantages of the lighted trees mentioned heretofore and many novel features that result in a new illuminating holiday tree which is not anticipated, rendered obvious, suggested, or even implied by any of the prior art lighted trees, either alone or in any combination thereof.

To attain this, the present invention generally comprises a disk-shaped base having a circular top face, a circular bottom face, and a periphery formed therebetween. The periphery has a plurality of tacks mounted along an entire periphery thereof. As shown in FIG. 1, garland is also coupled about the periphery. The top face is entirely covered with felt of a desired color. Next provided is a cylindrical post having a bottom end mounted to the top face of the base at a central extent thereof. The post extends upwardly from the base. A top end of the post has an eyelet formed therein and further a decorative ornament. FIG. 1 shows a string of multicolored lights strung about the post and further resting on the top face of the base. Each of the lights of the string is adapted for illuminating upon the receipt of power. Finally, a plurality of monofilament lines are each strung tautly between the eyelet of the post and an associated one of the tacks of the base. The lines are adapted for encompassing the post and lights. By this structure, the illumination of the lights permeates from the lines.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new illuminating holiday tree apparatus and method which has many of the advantages of the lighted trees mentioned heretofore and many novel features that result in a new illuminating holiday tree which is not anticipated, rendered obvious, suggested, or even implied by any of the prior art lighted trees, either alone or in any combination thereof.

It is another object of the present invention to provide a new illuminating holiday tree which may be easily and efficiently manufactured and marketed.

It is a further object of the present invention to provide a new illuminating holiday tree which is of a durable and reliable construction.

An even further object of the present invention is to provide a new illuminating holiday tree which is susceptible of a low cost of manufacture with regard to both materials and labor, and which accordingly is then susceptible of low prices of sale to the consuming public, thereby making such illuminating holiday tree economically available to the buying public.

Still yet another object of the present invention is to provide a new illuminating holiday tree which provides in the apparatuses and methods of the prior art some of the advantages thereof, while simultaneously overcoming some of the disadvantages normally associated therewith.

Still another object of the present invention is to provide a new illuminating holiday tree for uniquely illuminating a decorated holiday tree.

Even still another object of the present invention is to provide a new illuminating holiday tree that includes a base. A post is coupled to the base and extended upwardly therefrom. At least one light is mounted to the post and base for illuminating upon the receipt of power. Further included is monofilament line for encompassing the post, base, and light. As such, the illumination of the light permeates through the line.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
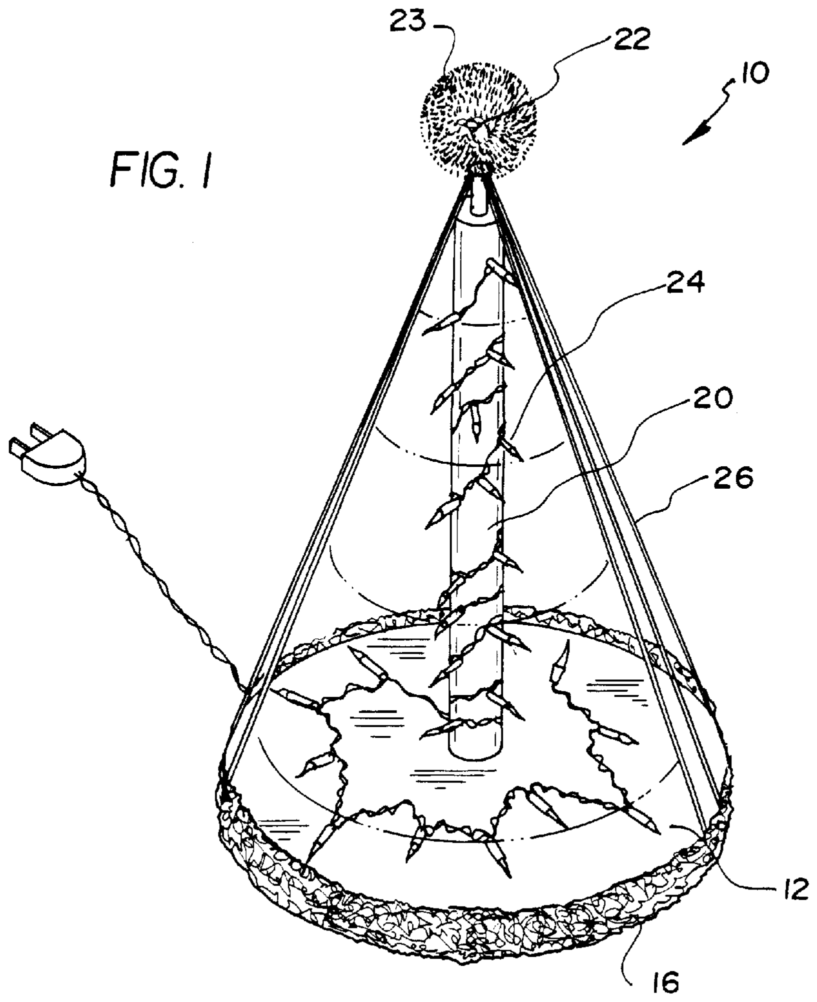
FIG. 1 is a perspective view of a new illuminating holiday tree according to the present invention.
Figure 2:
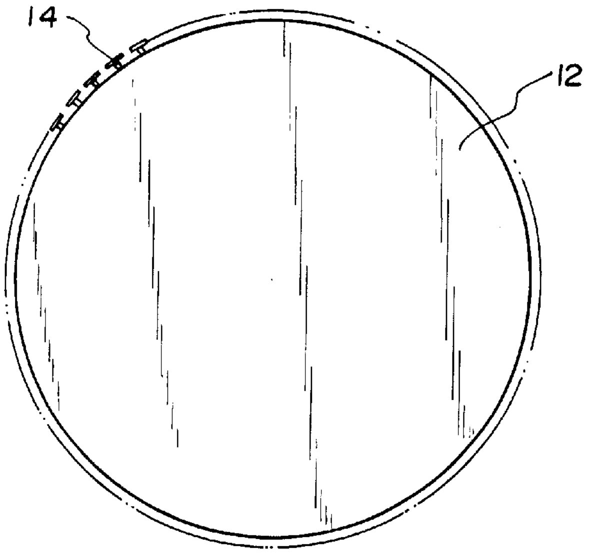
FIG. 2 is a bottom view of the present invention.
Figure 3:
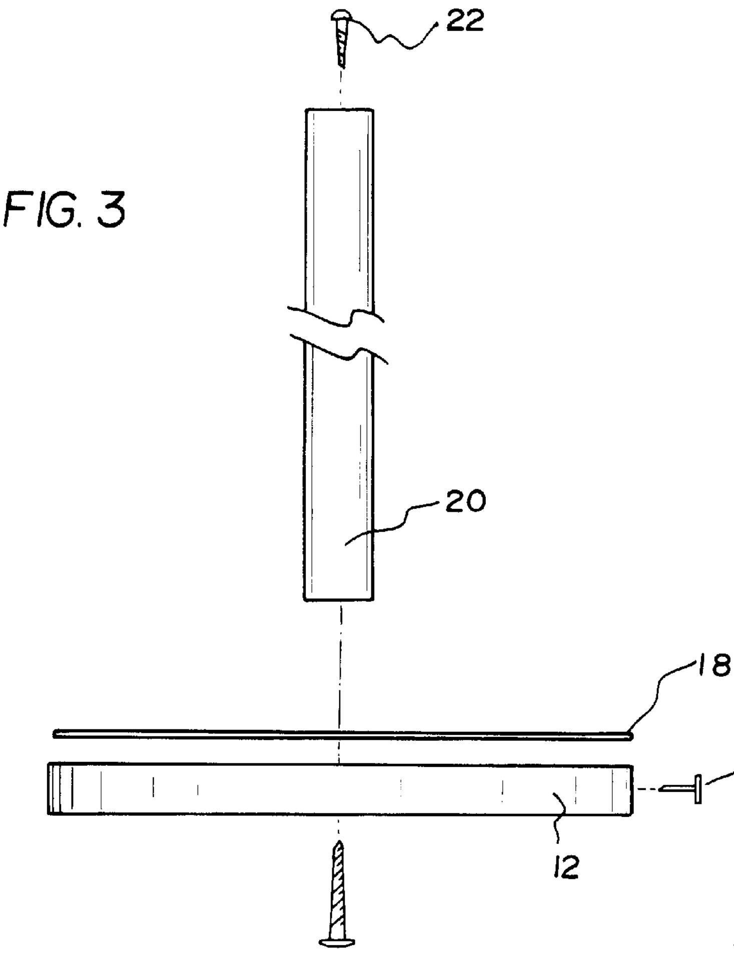
FIG. 3 is a side exploded view of the present invention.
Figure 4:
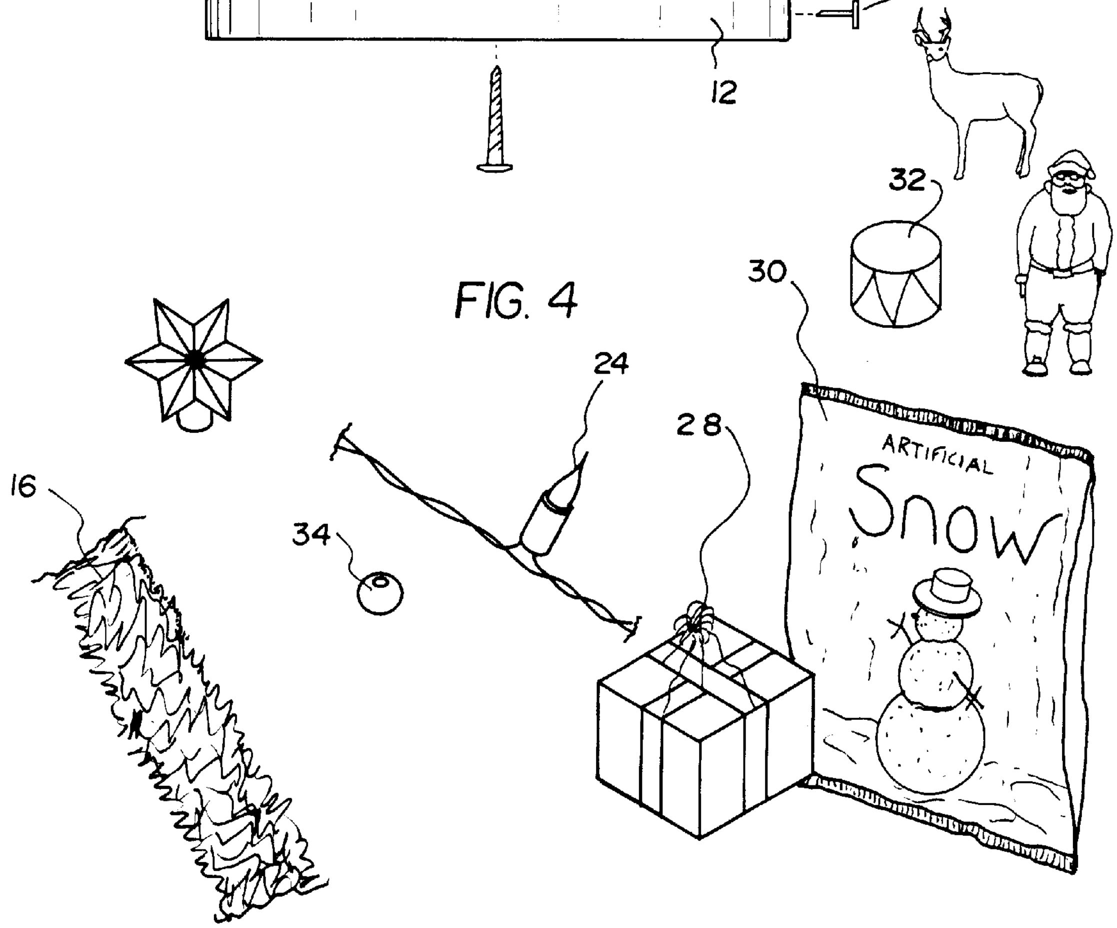
FIG. 4 is an exploded perspective view of an arrangement of various components of the present invention.

With reference now to the drawings, and in particular to FIGS. 1 through 4 thereof, a new illuminating holiday tree embodying the principles and concepts of the present invention and generally designated by the reference numeral 10 will be described.

The present invention, designated as numeral 10, includes a disk-shaped base 12 having a circular top face, a circular bottom face, and a periphery formed therebetween. The periphery has a plurality of tacks 14 mounted along an entire periphery thereof. As shown in FIG. 1, garland 16 is also coupled about the periphery. The top face is entirely covered with felt 18 of a desired color.

Next provided is a cylindrical post 20 having a bottom end screwably mounted to the top face of the base at a central extent thereof. The post extends upwardly from the base. A top end of the post has an eyelet 22 formed therein and further a decorative ornament 23.

FIGS. 1 shows a string of multi-colored lights 24 strung about the post in a serpentine configuration and further resting on the top face of the base. Each of the lights of the string is adapted for illuminating intermittently upon the receipt of power.

Finally, a plurality of monofilament lines 26 are each strung tautly between the eyelet of the post and an associated one of the tacks of the base. In the preferred embodiment, 6 lb. test fishing line is employed. The lines are adapted for encompassing the post and lights. By this structure, the illumination of the lights permeates from the lines. Preferably, the strings are components of a single string which is strung through the eyelet and wrapped around one of the tacks multiple times. This process is repeated until the line defines a cone-shaped peripheral wall.

As an option, packages 28, fake snow 30, a drum 32 and apertured beads 34 may be used to decorate the line, base, and post. Further decorations include ornaments, a fake deer and a fake santa. See FIG. 4. As an option, the various components may be sold disassembled and instructions may be included for facilitating the manual assembly and decoration of the present invention.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A decorative Christmas tree device comprising, in combination:

a disk-shaped base having a circular top face, a circular bottom face, and a periphery formed therebetween, the periphery having a plurality of tacks mounted along an entire periphery thereof and garland coupled thereto, the top face being entirely covered with felt;

a cylindrical post having a bottom end mounted to the top face of the base at a central extent thereof and extending upwardly therefrom, a top end of the post having an eyelet formed therein and further a decorative ornament;

a string of multi-colored lights strung about the post and further resting on the top face of the base for illuminating upon the receipt of power; and a plurality of monofilament lines each strung tautly between the eyelet of the post and an associated one of the tacks of the base for encompassing the post and lights, whereby the illumination of the lights permeates from the lines.

2. A decorative Christmas tree device comprising:

a base;

a post coupled to the base and extending upwardly therefrom;

at least one light mounted to at least one of the post and base for illuminating upon the receipt of power; and transparent covering means for encompassing the post, base, and light, whereby the illumination of the light permeates from the transparent covering means.

3. A decorative Christmas tree device as set forth in claim 2 wherein the covering means includes a plurality of monofilament lines.

4. A decorative Christmas tree device as set forth in claim 3 wherein the lines are coupled between a periphery of the base and a top of the post.

5. A decorative Christmas tree device as set forth in claim 4 wherein the lines are coupled about an entire periphery of the base.

6. A decorative Christmas tree device as set forth in claim 2 wherein a string of multi-colored lights is strung about the post.

7. A decorative Christmas tree device as set forth in claim 2 wherein a periphery of the base has garland coupled thereto.

8. A decorative Christmas tree device as set forth in claim 2 wherein a top face of the base is entirely covered with felt.

* * * * *